US007250846B2

(12) United States Patent
Ebling et al.

(10) Patent No.: US 7,250,846 B2
(45) Date of Patent: Jul. 31, 2007

(54) METHOD AND APPARATUS FOR PROVIDING DYNAMIC USER ALERT

(75) Inventors: Maria Rene Ebling, White Plains, NY (US); Guerney Douglass Holloway Hunt, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 10/091,248

(22) Filed: Mar. 5, 2002

(65) Prior Publication Data

US 2003/0169151 A1 Sep. 11, 2003

(51) Int. Cl.
*H04Q 7/00* (2006.01)
(52) U.S. Cl. .................. 340/7.28; 340/7.57; 340/7.59; 340/7.62
(58) Field of Classification Search ............... 340/7.28, 340/7.57, 7.59, 7.62, 7.58, 7.53, 7.61
See application file for complete search history.

(56) References Cited

U.S. PATENT DOCUMENTS

| 4,488,005 | A | | 12/1984 | Frantz | |
|---|---|---|---|---|---|
| 4,644,350 | A | * | 2/1987 | Ishii | 340/7.55 |
| 5,493,692 | A | * | 2/1996 | Theimer et al. | 455/26.1 |
| 5,625,680 | A | | 4/1997 | Foladare et al. | |
| 5,646,589 | A | * | 7/1997 | Murray et al. | 340/7.58 |
| 5,790,045 | A | * | 8/1998 | Hymel et al. | 340/7.58 |
| 5,815,081 | A | * | 9/1998 | Motohashi | 340/7.58 |
| 6,147,977 | A | | 11/2000 | Thro et al. | |
| 6,687,497 | B1 | * | 2/2004 | Parvulescu et al. | 455/420 |

OTHER PUBLICATIONS

H. Lieberman et al., "Out of Context: Computer Systems that Adapt to, and Learn from, Context," IBM Systems Journal, vol. 39, Nos. 3&4, pp. 617-632, 2000.
Motorola, T900 Personal Interactive Communicator, http://commerce.motorola.com/consumer/QWhtml/t900mdgoffer.html, 3 pages, 1999-2001.
Motorola Pager Glossary: P-R, http://commerce.motorola.com/consumer/QWhtml/glossary_pager_P.html, 1 page, 1999-2001.
Motorola, TalkAbout™ T900 Personal Interactive Communicator (PIC) Reference Guide, Motorola, Inc., 9 pages, 2000.
Nokia 3285 Cellular Phone, http://www.nokiausa.com/beauty/1,2498,74,FF.html, 5 pages, 2001.
Nokia 3390 Cellular Phone, http://www.nokiausa.com/3390, 3 pages, 2001.

(Continued)

*Primary Examiner*—Jeffery Hofsass
*Assistant Examiner*—Scott Au
(74) *Attorney, Agent, or Firm*—Anne V. Dougherty; Ryan, Mason & Lewis, LLP

(57) ABSTRACT

Techniques for providing a dynamic alert indication to a user of a signal receiving device. One technique includes the steps of processing a signal transmitted from a signal transmitting device to determine at least one mode to be associated with an alert indication, wherein the processing step includes the step of accessing a look-up table containing information associated with a user of the signal receiving device to determine the at least one mode to be associated with the alert indication; and alerting the user of the signal receiving device via the alert indication that the signal has been received by the signal receiving device.

32 Claims, 7 Drawing Sheets

OTHER PUBLICATIONS

U.S. Appl. No. 60/306,314, filed Jul. 18, 2001, Ebling et al. and entitled, "Method and Apparatus for Providing Extensible Scalable Transcoding of Multimedia Content.".

U.S. Appl. No. 09/862,524, filed May 22, 2001, Ebling et al. and entitled, "Information Retrieval With Non-Negative Matrix Factorization.".

U.S. Appl. No. 09/511,977, filed Feb. 24, 2000, Ebling et al. and entitled, "Method and Apparatus for Providing a Scaleable Pervasive Notification Service.".

U.S. Appl. No. 09/479,821, filed Jan. 7, 2000, Ebling et al. and entitled, "Method and Apparatus for Providing an Awareness-Service Architecture.".

* cited by examiner

METHOD AND APPARATUS FOR PROVIDING DYNAMIC USER ALERT

FIELD OF THE INVENTION

The present invention relates generally to communication systems, and more particularly to techniques for alerting users of messages arriving at one or more communication devices in an environment in which the devices are pervasive and users must be alerted to message arrival in an appropriate and context-sensitive fashion.

BACKGROUND OF THE INVENTION

With the proliferation of communication devices (e.g., cellular phone, two-way pagers, personal digital assistants, and the like) and their increased use in society comes the need for communication systems and devices that can adapt the mode used to alert users to an incoming message to the content of that message as well as the context of the device and its user.

A system for selectively delivering electronic messages to a user using mobile and fixed devices is described in U.S. Pat. No. 5,493,692, issued Feb. 20, 1996, and entitled "Selective Delivery of Electronic Messages in a Multiple Computer System Based on Context and Environment of a User" (hereinafter referred to as the '692 patent). More specifically, the '692 patent discloses a system that allows a sending party to give an electronic message a level of privacy and a set of context attributes. The level of privacy and the specified context attributes must be matched for the message to be delivered. The system uses this information to identify an appropriate device on which to deliver a message or to notify the user of the message. If none are available, the system holds the message until the constraints can be met. However, the system in the '692 patent does not use the user's dynamic context, the priority of the message, nor the user's static preferences to determine how best to alert the user of the message.

Today, communication devices allow users only a modest ability to control the behavior of their phones. For example, the Motorola Talkabout T900 2-way cellular phone offers two features which allow users to control the alert behavior of their device: "Private Time" and "Quiet Mode." When using private time, the user specifies a period of time each day during which the user will not be alerted to any messages, though the message will continue to arrive at the device. Quiet mode allows users to turn off all alerts, though again the device will continue to receive messages.

The Motorola V Series Model 66 cellular phone offers thirty-two (32) pre-set and thirty-two (32) customizable ring tones (i.e., alerts). The Motorola V Series Model 160c cellular phone allows incoming calls and messages to be distinguished by thirty-two (32) unique ringer tones. This customization is based solely upon caller-id-type functionality.

The Nokia 3285 Digital cellular phone allows similar functionality. In addition, however, the Nokia 3390 allows users to create and download profile settings that customize the phone's look and sound. The Nokia profiles allow a phone user to customize the phone's various alerts (incoming call, incoming message, error, low battery, etc.) manually. Users might change their current profile based upon their surroundings as well as their mood, interest in the functions of the phone, and the time-of-day. In addition, the user may create one or more custom ring tones using a ring tone composer. Nokia defines the term "ring tone" as a special user-selected tone to alert the user to an incoming call.

Although the profiles supported by these phones do allow the user to adjust and customize the alert for different conditions and environments, the user must switch from one profile to another manually. It is not uncommon for the user to forget, or not be otherwise able, to manually switch from one profile to another. For example, the user may be so deeply involved in a particular meeting or movie that the user forgets to switch to a quiet mode until he or she is reminded by an audible alert.

The Ericsson T29s cellular phone also has customizable profiles, but only selects certain profiles automatically when a particular accessory is used (such as the car hands-free unit).

There remains a need, therefore, for communication and computational devices which have the capability of automatically alerting a user in a manner most appropriate to that user's surroundings and environment, without manual intervention when the surroundings or environment change.

SUMMARY OF THE INVENTION

The present invention provides techniques for dynamically adapting a mode of alert to be associated with a signal receiving device. The signal receiving device may be, by way of example and without limitation, a cellular phone, a pager or a personal digital assistant (PDA). Based on several factors including the recipient's current context, the sender's suggested mode of alert, and the content of the message, the present invention dynamically determines the most appropriate mode of alert to be provided to the user.

For instance, in one aspect of the present invention, a technique for providing a dynamic alert indication to a user of a signal receiving device includes the following steps. A signal transmitted from a signal transmitting device is processed, to determine at least one mode to be associated with an alert indication. The processing step includes the step of accessing a look-up table containing information associated with a user of the signal receiving device to determine the at least one mode to be associated with the alert indication. The user of the signal receiving device is then alerted via the alert indication, that the signal has been received by the signal receiving device.

The invention provides for the table look-up operation to be done in a server, the signal receiving device, or some other associated device.

An advantage of the present invention is that alarming and/or inappropriate alert signals are eliminated, such as, for example, a loud audible tone sounding off during a business meeting or a quiet event such as an opera.

These and other objects, features and advantages of the present invention will become apparent from the following detailed description of preferred embodiments thereof, which is to be read in conjunction with the accompanying drawings, wherein like elements are designated by identical reference numerals throughout the several views.

DETAILED DESCRIPTION OF PREFERRED EMBODIMENTS

One system for maintaining the context of users and their devices is described in co-pending U.S. patent application Ser. No. 09/479,821, filed Jan. 7, 2000, entitled "Method and Apparatus for Providing an Awareness-Service Architecture" (the "awareness service architecture patent application"), incorporated herein by reference. A similar system is described in co-pending U.S. Provisional Patent Application Ser. No. 60/306,314, filed Jul. 18, 2001, entitled "Method and Apparatus for Providing Extensible Scalable Transcoding of Multimedia Content" (the "context service architecture patent application"), incorporated herein by reference. A context aware notification system for dispatching messages to a user's device based upon the context of the user and/or the user's device is described in co-pending U.S. patent application Ser. No. 09/511,977, filed Feb. 24, 2000, entitled "Method and Apparatus for Providing a Scaleable Pervasive Notification Service" (the "notification service patent application"), incorporated herein by reference.

The present invention improves upon these systems by providing techniques by which the alert used to notify a user of an incoming message and/or phone call is sensitive to the context of the user and/or the device and/or to the content of the message. It is to be appreciated that the techniques of the present invention may utilize, and/or be employed in, the applications and/or systems disclosed by the three above-referenced patent applications.

Figure 1A:
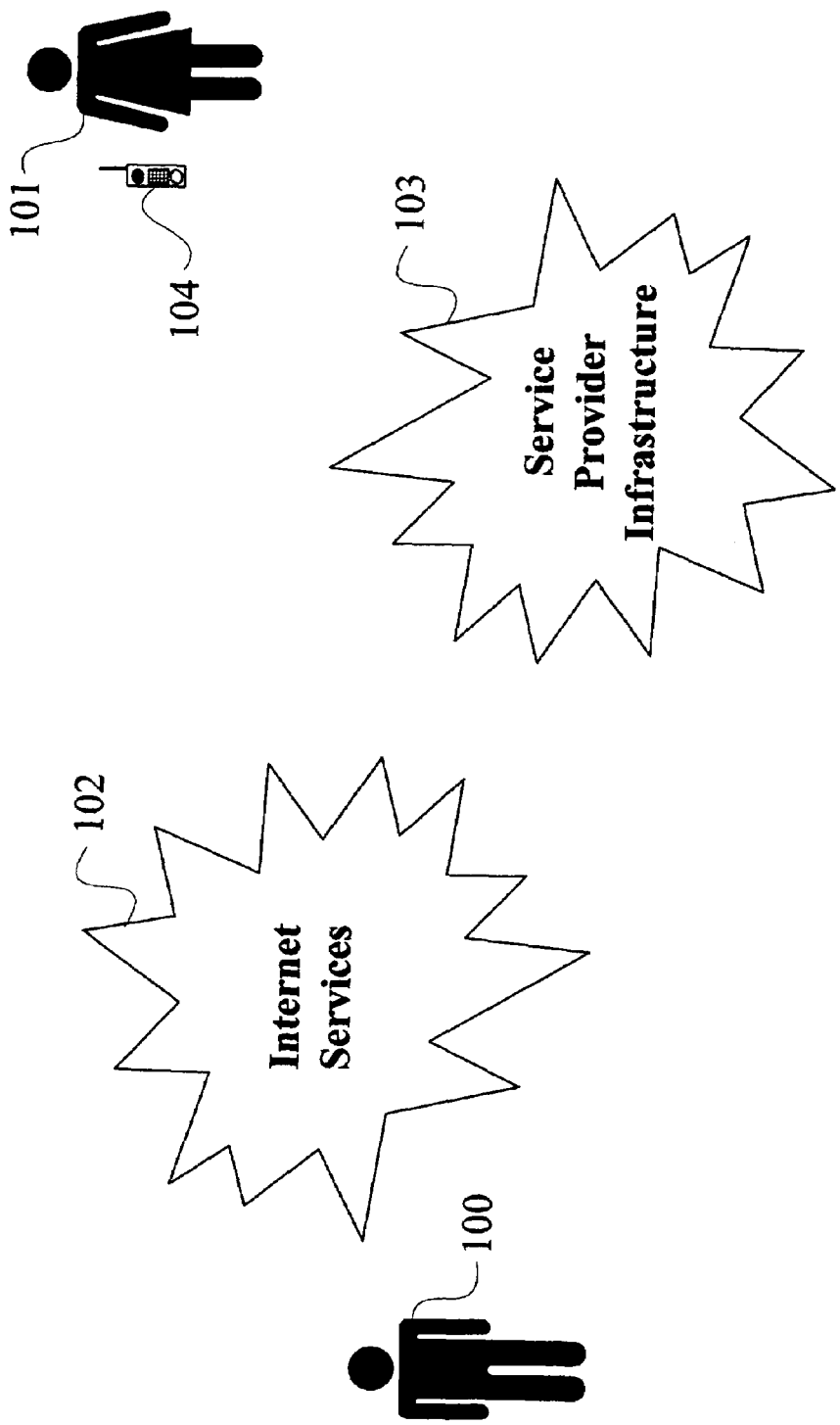
FIG. 1A is a general overview diagram illustrating the environment in which the present invention operates.

The present invention may be more fully understood with reference to FIG. 1A, which illustrates the environment in which a preferred embodiment of the invention operates. As shown in FIG. 1A, a first user, the sending party or sender 100, causes a message or call intended for a second user, the receiving party or, simply, receiver 101, to be transmitted. Typically, the message or call is transmitted from the sender 100 to the receiver 101 through services 102 (e.g., Internet services) provided by one or more service providers (such as that offered by a wireless communications company) in accordance with their infrastructure 103. After processing, the call is connected or the message may be delivered to a device 104 which is normally carried by the receiver 101. Upon receipt of the communication or message, the device 104 alerts the user to the arrival of the message using one of many ring tones or other modes of alert. It is contemplated that the message could be delivered to one or more service providers for delivery to one or more devices of the same or different types.

Figure 1B:
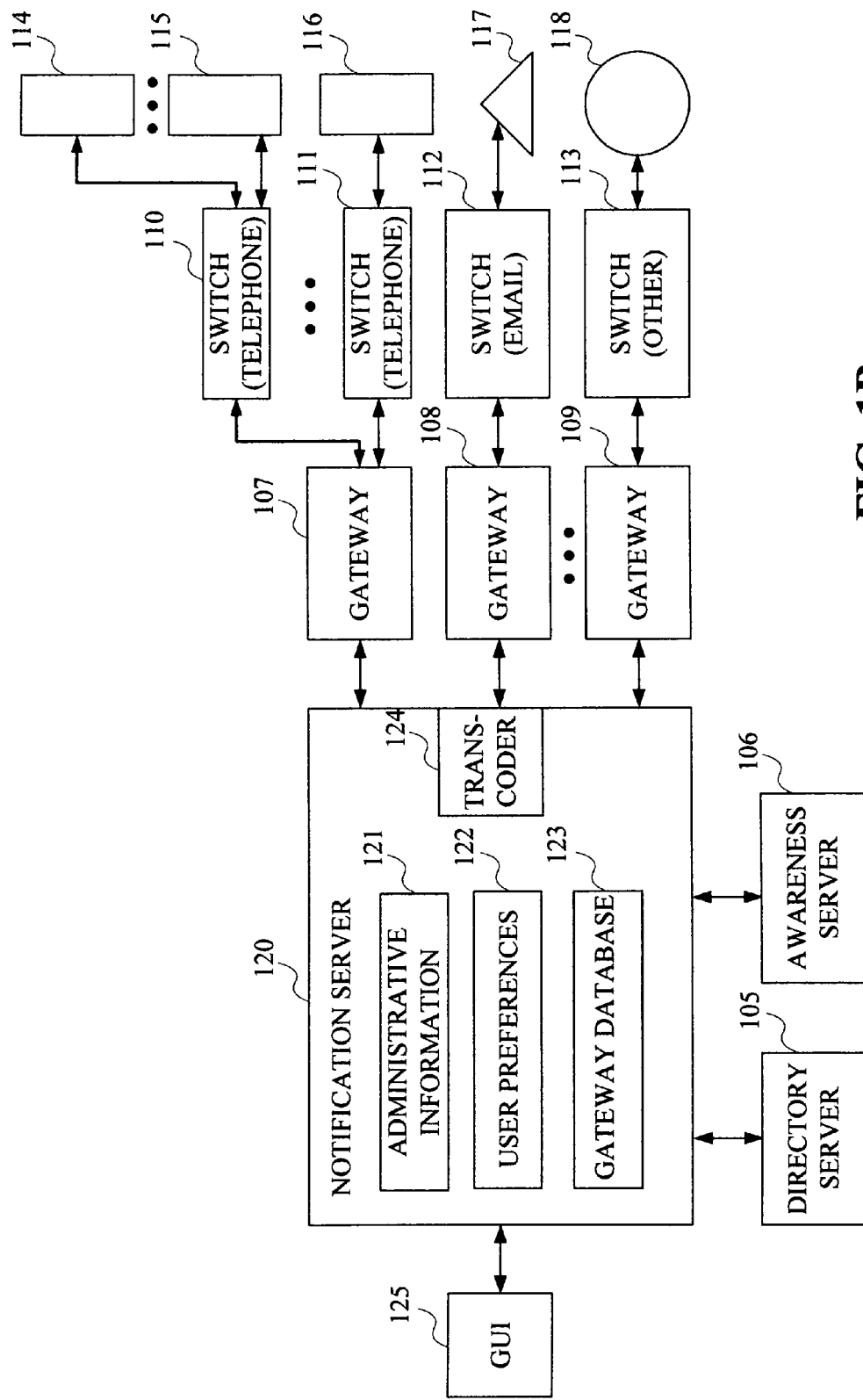
FIG. 1B is a block diagram depicting a notification server-based system which is utilized in connection with the present invention.

Referring now to FIG. 1B, a block diagram of a notification service architecture is illustrated. As shown in FIG. 1B, the notification service architecture comprises a directory server 105, an awareness server 106, one or more gateways 107, 108, 109, one or more switches 110, 111, 112, 113, one or more end-user devices 114, 115, 116, 117, 118, a notification server 120 and a graphical user interface 125. The notification server 120 preferably includes a database containing administrative information 121. This administrative information may include, for example, service subscribers. The information maintained in this database might also include, but is not limited to, user identifiers, passwords and encryption keys. Those skilled in the art will recognize that this administrative database 121 is preferably a logical database and could be realized as one or more physical data stores. Those skilled in the art will also recognize that the one or more physical data stores that implement the functionality of the logical administrative database 121 may be implemented in any number of ways, including a formal database or a flat file.

FIG. 1B further depicts a preferences database 122 included in the notification server 120. This preferences database 122 preferably maintains the preferences of the service's subscribers or users. The preferences database 122 may be modified by the user through the use of, for example, a graphical user interface 125. The method of modifying the preferences database 122 may vary and is not limited to modification by a user through graphical user interfaces. Furthermore, it is to be appreciated that the user preferences could potentially change frequently. Although the preferences database 122 is depicted as being included within the notification server 120, the preferences database 122 may be external to the notification server 120.

FIG. 1B also depicts a gateway database 123. The gateway database 123 preferably maintains information about the various gateways accessible to the notification service for use in delivering electronic messages. This information might include, but is not limited to, service identifiers (to identify this notification service to the gateway service), passwords and encryption keys. It is to be appreciated that this gateway database 123 is preferably a logical database, and may be realized as one or more physical data stores. Those skilled in the art will also recognize that the one or more physical data stores that implement the functionality of the logical gateway database 123 may be implemented in any number of ways, including a formal database or a flat file.

With continued reference to FIG. 1B, there is also shown a transcoding engine 124 which is preferably used to transcode the electronic message prior to transmission to the gateway. This transcoding might include, but is not limited to, removing images, modifying images, removing attachments, summarizing content, removing confidential material, summarizing information about the message (e.g., name of sender, date sent, subject, etc.) and the like.

FIG. 1B further shows the notification server connected to two other services, namely, a directory server 105 and an awareness server 106. It is contemplated that the awareness server 106 also provides context service. Thus, when reference is made herein to awareness server 106, such reference includes context service. The directory server 105 preferably provides information to the notification service regarding the devices available to a particular subscriber and the characteristics of those devices. The directory server 105 could be provided by a common directory service or another database. The awareness server 106, such as that described in the awareness service architecture patent application and the context service architecture patent application, provides, among other things, information regarding the current accessibility of the devices available to a particular subscriber and the context of that subscriber. It is contemplated that the information provided by the awareness server 106 may be manually input by the user.

FIG. 1B further depicts a number of connections to gateway services 107, 108 and 109. By way of example, gateway 107 is shown connected to a telephone network, gateway 108 is connected to an e-mail service network and gateway 109 is connected to another communication service. FIG. 1B also shows each gateway connected to one or more switches, 110, 111, 112 and 113. These switches 110, 111, 112 and 113, if employed, preferably provide network connectivity to particular devices. It is to be appreciated that the device may also be connected directly to a gateway, in which case the switch may be eliminated.

A message is transmitted by a transmitter 100 (see FIG. 1A) and enters the architecture illustrated FIG. 1B through the notification server 120. Ultimately, the message is received by at least one of the end-user devices 114, 115, 116, 117 and 118. Each of the end-user devices is preferably connected to an appropriate switch 110, 111, 112, or 113. The switches are in a unique position to report information regarding the devices they service to other parties, such as to an awareness service 106 similar to that disclosed in the co-pending awareness service architecture patent application and the context service architecture patent application described above or to a gateway service. Those skilled in the art will recognize that additional gateways can be added for use with the present invention as new network types and/or topologies are developed. In addition, it is to be appreciated that if multiple networks have the same or similar characteristics, they could be handled by a single or common gateway service.

Figure 2:
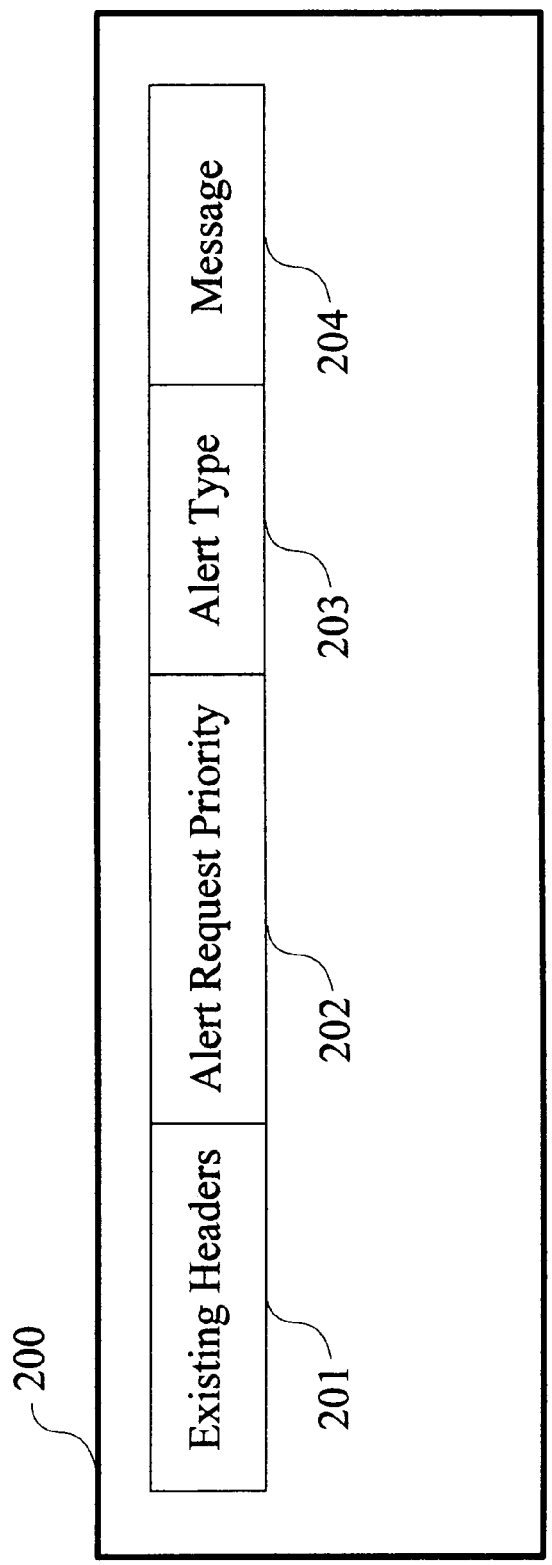
FIG. 2 is a block diagram illustrating the parts of a message that are sent to a device.

The present invention provides a ring tone or other mode of alert indication which is dynamically determined based upon the recipient's current context, the sender's suggested mode of alert, and the content of the message. FIG. 2 illustrates one way in which the alert may be specified with an incoming message 200. The message 200 is typically sent as a number of headers 201 associated with a message body 204. The present invention adds an alert request priority 202 and an alert type 203 to the message 200. The alert type 203 specifies the mode of alert. For example, alert type 203 may specify which of a predetermined number of pre-set or customizable ring tones may be used (e.g., such as, but not limited to, the 32 ring tones offered by the Motorola V Series Model 66 cellular phone). The alert request priority 202 informs the device 104 and the awareness server 106 of the importance of using the specified alert type. For example, the alert request priority 202 indicates that use of the specified alert type is optional or required.

The present invention contemplates many ways in which the type of alert can be chosen. In a preferred embodiment, a notification server (such as the one shown in FIG. 1B) determines the best type of alert to use based upon the sender of that message, the content of that message, and the context of the intended recipient.

Figure 3A:
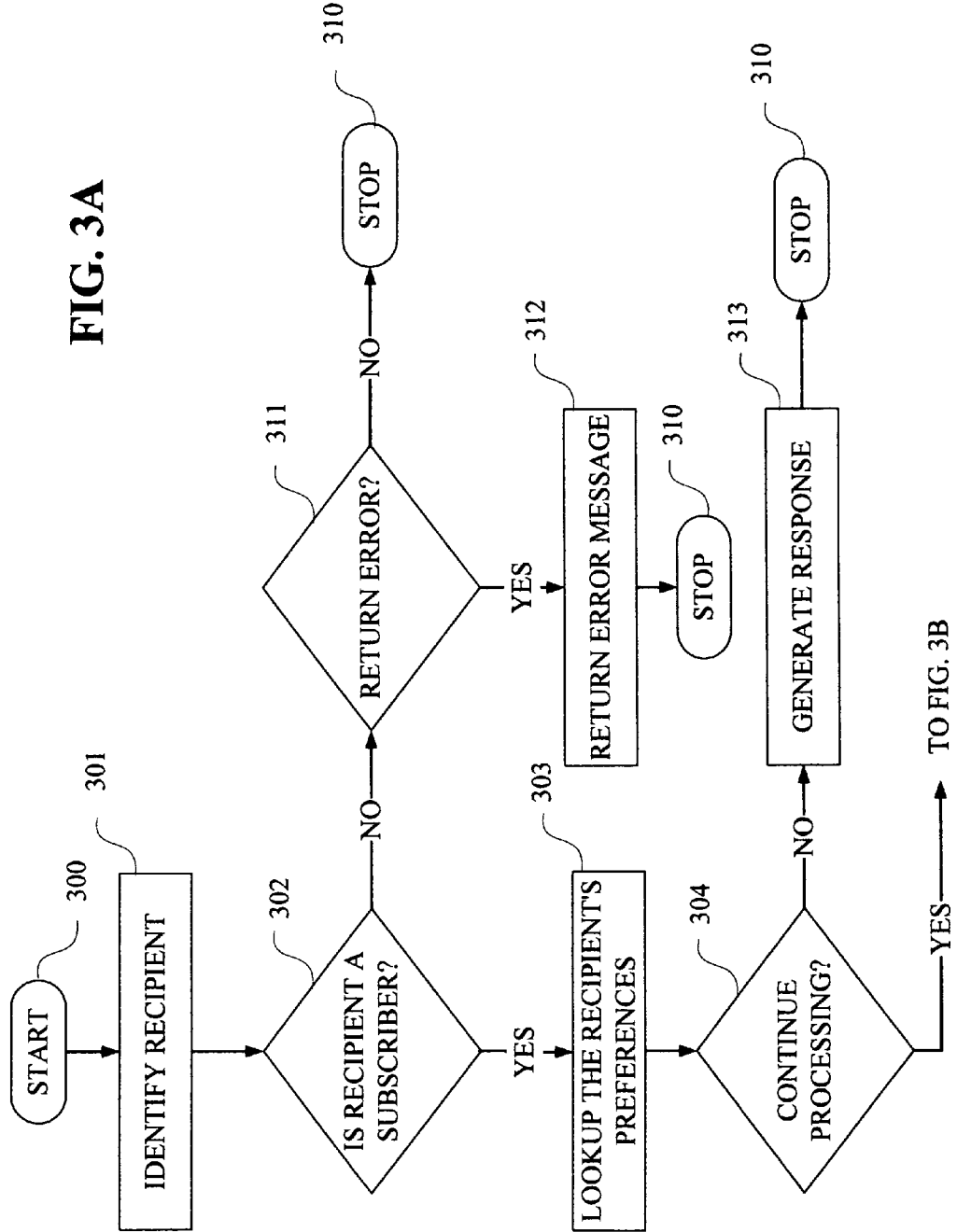
FIG. 3A is a logical flow diagram illustrating the steps taken by a notification server in delivering a message to a device.
Figure 3B:
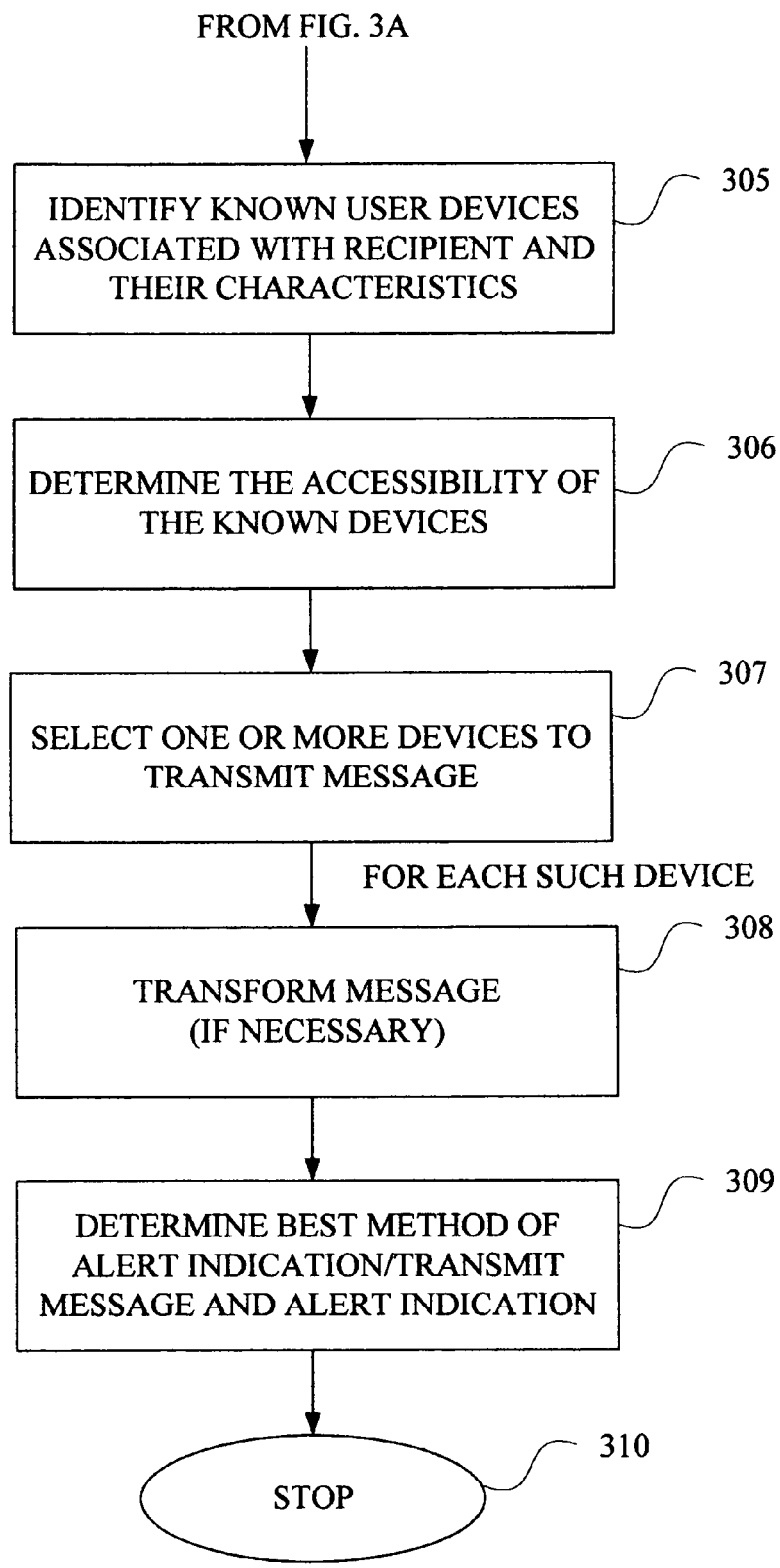
FIG. 3B is a logical flow diagram illustrating the steps taken by a notification server in delivering a message to a device.

FIGS. 3A and 3B illustrate a logical flow diagram of the processing that occurs, in accordance with a preferred embodiment of the present invention, once the notification server receives a message to be delivered. With reference to FIG. 3A, upon receipt of a message, the process is started in block 300. The notification server preferably first identifies the intended recipient of the message in step 301 and verifies that the intended recipient is a subscriber (i.e., user) of the service in step 302. If the intended recipient is not a subscriber of this service, the notification server preferably determines whether an error message should be generated in step 311. If not, processing stops at this point, as indicated by block 310, and the message is preferably dropped. If the processor determines that an error message is to be returned to the sender, the error message is generated and subsequently returned to the sender in step 312 before processing stops at block 310.

If the intended recipient is a subscriber of the notification service, the service preferably looks up the intended recipient's preferences in step 303, which are preferably stored in user preferences database 122 (see FIG. 1B) and include the user's alert preferences. The system then determines, in step 304, whether or not processing should continue. If the user's preferences indicate that this sender may not send a message to him or her, then the system generates a response in step 313 and then stops processing this message, as indicated in step 310. Otherwise, the system then identifies, in step 305, the recipient's known devices as well as the characteristics of those devices. The system then checks with its awareness or context service 106 to determine, in step 306, the accessibility of the known devices. The system then uses this accessibility information along with the user's preferences to select, in step 307, which one or more of these devices to use to deliver the message to the user. For each selected device, the system transforms, in step 308, the message and determines, in step 309, the best mode of alert before transmitting, also in step 309, the message to the selected device. Upon completion of these steps, processing stops, as indicated in step 310.

As referred to in step 308, a message might be transformed by the notification server, for example, to remove elements of the message for which the gateway (or its associated device) is not capable of processing, or to filter confidential material prior to sending the message to an untrusted or unsecured gateway (e.g., removing confidential attachments or sending just a brief summary of information about the message, such as the subject line and the name of the sender). For discussions of transcoding, see A. Fox et al., "Adapting to network and client variation using active proxies: Lessons and perspectives", IEEE Personal Commun., Vol. 40, 1998; A Fox et al., "Reducing WWW latency and bandwidth requirements by real-time distillation", Proc. Intl. WWW Conf., Paris, France, May 1996; T. W. Bickmore et al., "Digestor: Device-Independent Access to the World-Wide Web", Proc. 6th Int. WWW Conf., Santa Clara, Calif., 1997; M. Hori et al., "Annotation-Based Web Content Transcoding," The International Journal of Computer and Telecommunications Networking, Vol. 33, pp. 197-211, Elsevier, May 2000; and J. R. Smith et al., "Content-based transcoding of images in the Internet," IEEE Intl. Conf. on Image Processing (ICIP), Chicago, Ill., October 1998, each of which is incorporated by reference herein. As appreciated by one having ordinary skill in the art, it is contemplated that the message may also be transmitted in an encrypted form, in accordance with conventional or proprietary encryption means, to provide an added level of security.

Prior to transmitting the message packet 200, a determination of the best method of alert indication must be made in step 309. This determination is made based upon the context of the receiver, the preferences of the receiver, and the request of the sender. In a preferred embodiment, the least intrusive alert type is chosen. The notification server 120 then inserts the alert request priority 202 (see FIG. 2) and the alert type 203 (see FIG. 2) before transmitting, also in step 309, the message packet 200 to the signal receiving device. After transmitting the message packet in step 309, processing by the notification server 120 stops, as indicated in step 310.

Upon receipt of the message packet 200, the signal receiving device inspects the message to determine the alert request priority 202 and the alert type 203. The signal receiving device then compares its current settings with the alert request priority 202 and the alert type 203 included in the received message. If the device's current settings are less intrusive than the request alert type 203, the device uses its current settings to alert the user to the received message. If the device's current settings are more intrusive than the request alert type 203, then the device relies on the alert request priority 202 to determine the actual mode of alert. If the alert request priority 202 specifies that using the request alert is optional, the device will alert the user to the receipt of the message using the device's current settings. If the alert request priority 202 specifies that using the requested mode of alert is required, then the device will alert the user to the receipt of the message using the requested alert type 203.

Figure 4:
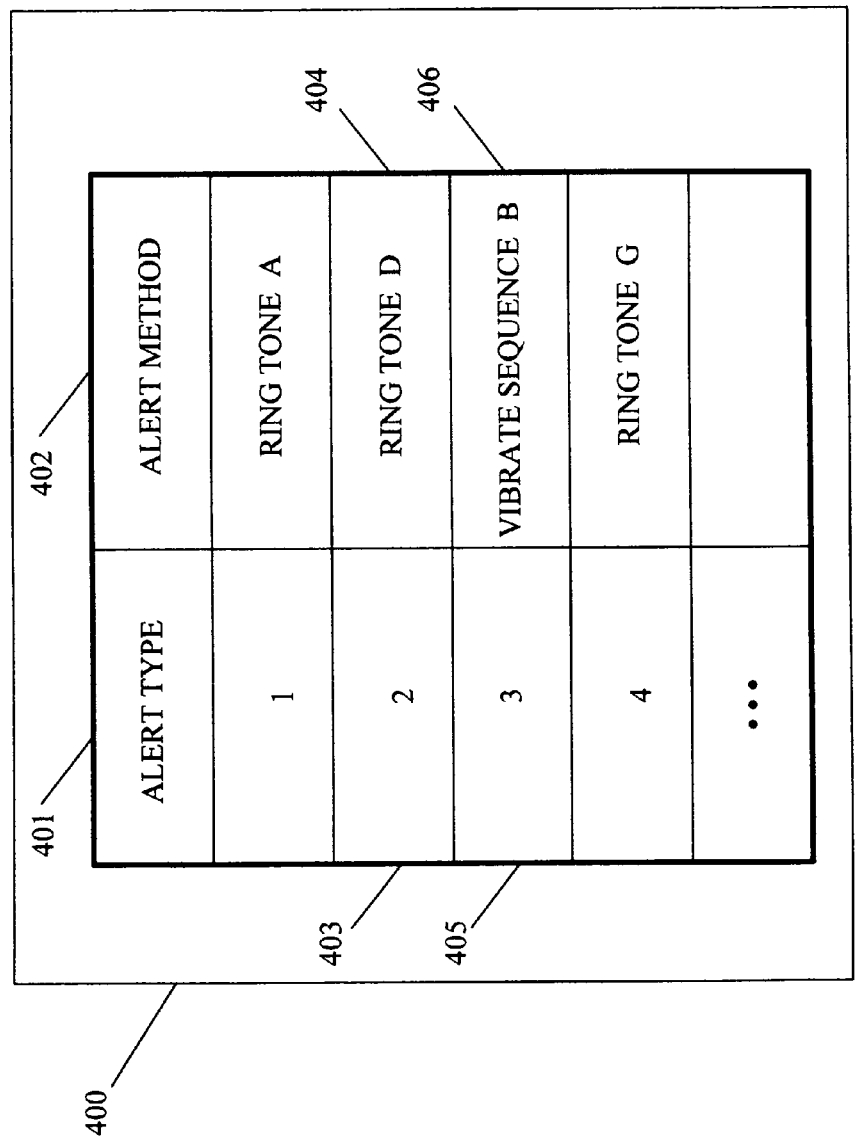
FIG. 4 is a block diagram illustrating a look-up table that is associated with a device for the purpose of identifying a method of alert from the type specified in a message header.

In a preferred embodiment, the alert type 203 specifies a key in a look-up table. Referring now to FIG. 4, using the specified alert type 203 from FIG. 2, the device and/or server consults the look-up table under alert type 401 to determine the actual alert method 402 to use. For example, as shown in FIG. 4, if the alert type 401 (which is the same as alert type 203) specified the number 2, the device looks at the row in which the alert type 401 value equals the number 2. In this case, the first cell of this row has reference numeral 403. The alert method 402 associated with this alert type is cell 404, or ring tone D. The device then uses this particular ring tone to alert the user to the arrival of this message. Similarly, if the message specified alert type 3, cell 405, then the device uses vibrate sequence B as shown in cell 406.

If, however, the alert type 203 is inconsistent with the device's settings (e.g., the signal receiving device is set to ring a particular ring-tone but the alert type for this message is a silent alert), the device must then examine the alert request priority 202 (shown in FIG. 2). If the alert request priority 202 is "optional," then the device uses its current settings. If the alert request priority 202 is "required," then the device must use the requested alert in place of the device's current settings.

During the transmission of a confidential message, a packet containing just an alert without the body of the message could be sent to the device indicating the importance of the message. That is, the alert may indicate various levels of importance associated with a particular message such as, for example, "urgent" or "for your information." The user could then request the message content at a more appropriate time, and possibly in a more appropriate environment.

Any of a number of algorithms could be used to resolve inconsistencies between the alert type and the device's settings. The one given above is used for illustrative purposes only. In an alternative embodiment, alert types may be classified into equivalence classes based upon their degree of intrusiveness. For example, all audible alert modes are in one equivalence class and all silent modes are in another. Thus, if a silent mode or quiet mode of alert is required by the receiver, it is contemplated that the sender cannot override the specified mode of alert with a more intrusive mode of alert indication. Accordingly, the notification server specifies only whether a silent or an audible alert be used and the device's settings determine the actual alert mode used within that constraint.

At any stage along the way from the sender to the recipient, the mode of alert could be specified. For example, in the present invention, the notification server, described in U.S. patent application Ser. No. 09/511,977, is extended to determine how best to alert the user of the arrival of a message or other communication to a signal receiving device. The notification server determines the best alert method based upon the user's and the device's current context, as maintained by an awareness or context service (such as those described in co-pending U.S. patent application Ser. Nos. 09/479,821 filed Jan. 7, 2000 and 60/306,314 filed Jul. 18, 2001). For example, the system is capable of choosing to forward non-urgent messages to voice mail or to e-mail, depending upon the type of the incoming message and the user's preferences.

The user's current state or context is maintained by an awareness or context service and could also influence message transcoding performed in step 308 of FIG. 3B. If the user is in a public setting, the system is capable of choosing to transcode a message in one way whereas if the user is in a private setting, the system chooses to transcode the message in a different way. For example, the system chooses not to display a message marked confidential in a public area and instead chooses to transcode the message to audio for playback over a cellular phone. If no other means of notification is possible, the system simply tells the recipient that a confidential message has arrived (providing an indication of the sender) and gives the user the option of displaying the message or not. Similarly, if the user is currently in a meeting, the system chooses different ring tones to indicate who the caller is or the importance of the arriving message to the recipient so that the user can better decide whether or not to take the phone call.

One having ordinary skill in the art will recognize that many different forms of context could be used to make such determinations. These different forms include, but are not limited to, location and calendar (e.g., an appointment to attend a movie or an opera as listed on an electronic calendar such as, for example, Lotus Notes or Microsoft Outlook) context.

The type of alert may be determined at other locations in the architecture or the device itself could monitor its own context. For example, the device monitors the ambient noise level and adjust its behavior based upon a model of the environment. If the environment were particularly quiet, the device uses a non-audible alert mode. If the environment were not particularly quiet, the device uses a ringing alert mode. If the environment were particularly noisy (such that the user might not hear the phone), the device switches back to a non-audible alert mode or use a dual alert (e.g., ringing and vibrating the phone simultaneously). Further, the sender of the message or the caller supplies a hint, or a requested mode of alert. For example, the sender or caller might request that their incoming message or phone call be alerted to the recipient with a ring tone or even with a particular ring tone. It is further contemplated that the notification server 120 might request assistance from the sender of the message to determine the requested alert type 203. For example, the notification server 120 might disclose the recipient's current context to the sender of the message (if allowed by any privacy policies that might be in place) and ask the sender to choose the best alert type 203.

It is contemplated that the device receives assistance from its environment. For example, a bluetooth-enabled device might receive a communication at the door to "sensitive" environments (also referred to as a context service environment) informing the device that it has entered an environment in which no audible modes of alert may be used or in which no modes of alert may be used. In such a situation, the cellular phone (or other device such as, for example, a personal digital assistant or a two-way pager) adjusts its behavior accordingly. It is further contemplated that for usability or other reasons, the device is configured to alert its user to the change in environment and the implications on future alerts in that particular vicinity. Additionally, the device forwards this information on to its awareness or context service or other infrastructure and does not act on the information directly. Alternatively, the device could act on the information itself and also forward the information to an awareness or context service or other component of the infrastructure. The environment might identify the type of environment it is, from a standardized list of environment types. From this information, the user could specify the preferred behavior for the specified type of environment and/or the service providers and device manufacturers could implement the required behavior for that environment.

It is contemplated that the service provider's infrastructure is modified to support such a system. For example, infrastructure installed in sensitive environments might refuse to transmit calls or messages with audible alerts or it might modify the mode of alert to a non-audible one.

Some particularly sensitive environments include those within hospitals, airplanes and blasting zones (such as appear in a highway construction site). In such environments, the use of cellular phone and other computer and communication devices might be banned. The present invention prevents the use of these devices within the sensitive environment. More specifically, transmitters within the sensitive environment may transmit a reconfiguration signal to these devices which precludes the device from transmitting further signals. Upon leaving the sensitive environment, the transmitter can send a second reconfiguration signal that returns the device back to its normal operating mode. While in the sensitive environment, the service provider could, possibly with the assistance of the transmitter, inform callers that the user is temporarily unavailable or a similar such message.

It is also contemplated that a transmitter within a sensitive environment could send a reconfiguration signal that precludes the device from operating its radio at all (even in a listen-only mode) and that causes the device to turn its radio off. In this case, a second reconfiguration signal would be ineffective and the user will need to remember to turn the radio back on upon leaving the sensitive environment. Alternatively, the device could set an alarm and query the user to determine if the user has left the sensitive environment. If the user responds in the affirmative, the device could re-enable its radio; if not, the device could reset the alarm and re-query at a later time. Also, the transmitter's reconfiguration signal could suggest a time for that alarm to go off. It is further contemplated that the reconfiguration signal might indicate that the device should turn itself off. In this case, the user will be required to turn the device back on upon leaving the sensitive environment.

Figure 5:
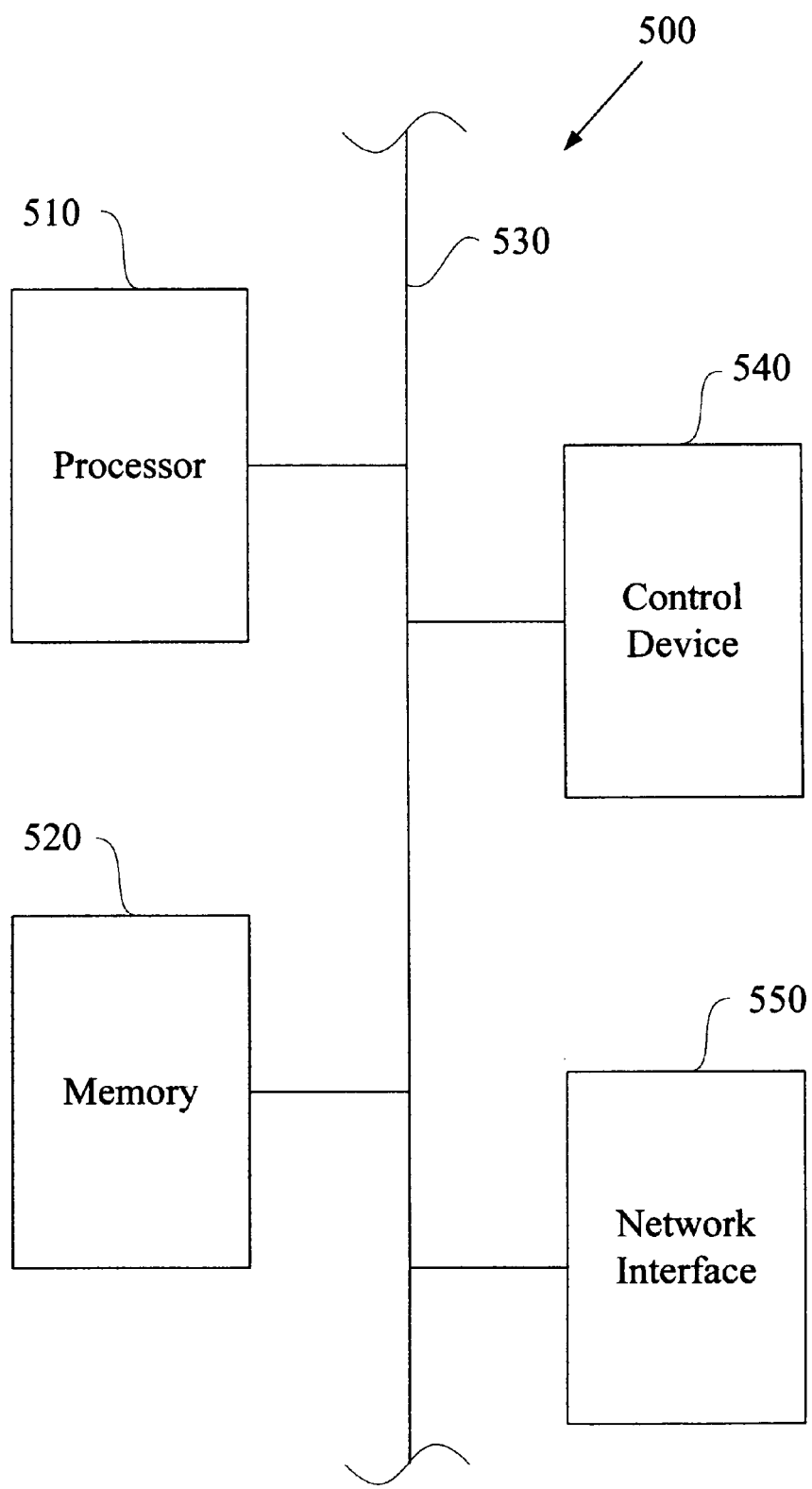
FIG. 5 is a block diagram illustrating a processing device for use in accordance with an embodiment of the present invention.

FIG. 5 shows an example of a processing device 500 that may be used to implement, for example, one or more computer software programs for executing the functions of the present invention. The processing device 500 includes a processor 510 and a memory 520 which communicate over at least a portion of a set 530 of one or more system buses. Also utilizing a portion of the set 530 of system buses are a control device 540 and a network interface device 550. The processing device 500 may represent, for example, portions or combinations of one or more of the signal receiving device, the notification server, a desktop computer or any other type of processing device for use in implementing at least a portion of the functions in accordance with the present invention. The elements of the processing device 500 may correspond to conventional elements of such devices.

For example, the processor 510 may represent a microprocessor, central processing unit (CPU), digital signal processor (DSP), or application-specific integrated circuit (ASIC), as well as portions or combinations of these and other processing devices. The memory 520 is typically an electronic memory, but may comprise or include other types of storage devices, such as disk-based optical or magnetic memory. The control device 540 may be associated with the processor 510. The control device 540 may be further configured to transmit control signals.

Additionally, the notification server 120 (shown in FIG. 1) preferably includes a processing device which, in conjunction with other related functional subsystems (e.g., memory, control unit, etc.), as appreciated by those skilled in the art, is capable of running an applications program for controlling the one or more aspects of the notification server. For example, the processing device may be used for controlling access to any of the database information described above, transforming message data (e.g., transcoding), communicating with services associated with the notification server (e.g., directory server 105, awareness server 106, etc.) interfacing with users, or transmitting message to the gateways 107, 108, and 109.

The techniques of the present invention described herein may be implemented in whole or in part using software stored and executed using the respective memory and processor elements of the processing device 500. For example, the techniques may be implemented at least in part using one or more software programs stored in memory 520 and executed by processor 510. The particular manner in which such software programs may be stored and executed in device elements such as memory 520 and processor 510 is well understood in the art and therefore not described in detail herein.

It should be noted that the processing device 500 may include other elements not shown, or other types and arrangements of elements capable of providing the function of the present invention described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of providing a dynamic alert indication to a user of a signal receiving device, the method comprising the steps of:

obtaining context information at the signal receiving device;

storing at least a portion of the context information at the signal receiving device;

forwarding at least a portion of the context information to a context service system located remote from the signal receiving device; and automatically modifying, based on at least a portion of the context information, an alert indication mode associated with the signal receiving device, wherein the alert indication mode causes an alert indication to be provided to the user of the signal receiving device upon receipt of a signal by the signal receiving device, the alert indication being appropriate to an environment in which the user is presently located;

wherein automated modification of the alert indication mode is effectuated remotely by the context service system or locally by the signal receiving device.

2. The method of claim 1, further comprising the step of the context service system causing service provider infrastructure, responsible for sending the signal to the signal receiving device, to be modified consistent with the alert indication mode.

3. The method of claim 1, further comprising the step of the context service system making one or more signal transmitting devices aware of the alert indication mode of the signal receiving device.

4. The method of claim 1, further comprising the step of the context service system forwarding at least a portion of the context information obtained from the signal receiving device to one or more signal transmitting devices.

5. The method of claim 1, further comprising the step of the context service system forwarding at least a portion of the context information obtained from the signal receiving device to one or more context service systems.

6. The method of claim 1, further comprising the step of the context service system storing previously-provided information about the user and about one or more signal receiving devices associated with the user for use in automatically modifying the alert indication mode of at least one of the one or more signal receiving devices.

7. The method of claim 1, wherein the alert indication mode is at least one of audible and non-audible.

8. The method of claim 7, wherein the non-audible mode comprises vibrating the signal receiving device.

9. The method of claim 7, wherein the audible mode comprises one or more ring tones.

10. The method of claim 1, wherein the alert indication mode is suggested by a sender of the signal.

11. The method of claim 1, further comprising the steps of the context service system making available at least a portion of the context information to one or more other users of the context service system, receiving an alert indication mode from one of the one or more other users of the context service system, and forwarding the alert indication mode to the signal receiving device.

12. The method of claim 11, wherein a user of the context service system is a program or an explicit or implicit user.

13. The method of claim 1, further comprising the step of evaluating the signal to determine its relative importance based on content of the signal.

14. The method of claim 1, wherein the signal receiving device comprises one of a cellular telephone, personal digital assistant, and a pager.

15. The method of claim 1, wherein the automated modification step may determine that no mode of alert indication may be utilized by the signal receiving device while within the environment.

16. The method of claim 1, further comprising the step of blocking signals to and from the signal receiving device while within the environment.

17. A signal receiving device, comprising:
a memory; and
a processor coupled to the memory and operative to: (i) obtain context information; (ii) store at least a portion of the context information; (iii) forward at least a portion of the context information to a context service system located remote from the signal receiving device; wherein, based on at least a portion of the context information, an alert indication mode associated with the signal receiving device is automatically modified, wherein the alert indication mode causes an alert indication to be provided to the user of the signal receiving device upon receipt of a signal by the signal receiving device, the alert indication being appropriate to an environment in which the user is presently located;
further wherein automated modification of the alert indication mode is effectuated remotely by the context service system or locally by the signal receiving device.

18. A context service server, comprising:
a memory; and
a processor coupled to the memory and operative to: (i) obtain context information associated with a signal receiving device; (ii) store at least a portion of the context information; (iii) forward at least a portion of the context information to one or more signal transmitting devices;
wherein, based on at least a portion of the context information, an alert indication mode associated with the signal receiving device is automatically modified, wherein the alert indication mode causes an alert indication to be provided to a user of the signal receiving device upon receipt of a signal by the signal receiving device from one of the signal transmitting devices, the alert indication being appropriate to an environment in which the user is presently located;
further wherein automated modification of the alert indication mode is effectuated remotely by the context service server or locally by the signal receiving device.

19. A method of providing a dynamic alert indication to a user of a signal receiving device, the method comprising the steps of:
obtaining context information from a context service located remote from the signal receiving device;
storing at least a portion of the context information at the signal receiving device;
forwarding at least a portion of the context information to one or more signal transmitting devices;
and automatically modifying, based on at least a portion of the context information, an alert indication mode associated with the signal receiving device, wherein the alert indication mode causes an alert indication to be provided to the user of the signal receiving device upon receipt of a signal by the signal receiving device, the alert indication being appropriate to an environment in which the user is presently located; wherein automated modification of the alert indication mode is effectuated remotely by the context service system or locally by the signal receiving device.

20. The method of claim 19, further comprising the step of the context service system causing service provider infrastructure, responsible for sending the signal to the signal receiving device, to be modified consistent with the alert indication mode.

21. The method of claim 19, further comprising the step of the context service system forwarding at least a portion of the context information to one or more context service systems.

22. The method of claim 19, further comprising the step of the context service system storing previously-provided information about the user and about one or more signal receiving devices associated with the user for use in automatically modifying the alert indication mode of at least one of the one or more signal receiving devices.

23. The method of claim 19, wherein the alert indication mode is at least one of audible and non-audible.

24. The method of claim 19, wherein the non-audible mode comprises vibrating the signal receiving device.

25. The method of claim 19, wherein the audible mode comprises one or more ring tones.

26. The method of claim 19, wherein the alert indication mode is suggested by a sender of the signal.

27. The method of claim 19, further comprising the steps of the context service system making available at least a portion of the context information to one or more other users of the context service system, receiving an alert indication mode from one of the one or more other users of the context service system, and forwarding the alert indication mode to the signal receiving device.

28. The method of claim 27, wherein a user of the context service system is a program or an explicit or implicit user.

29. The method of claim 19, further comprising the step of evaluating the signal to determine its relative importance based on content of the signal.

30. The method of claim 19, wherein the signal receiving device comprises one of a cellular telephone, personal digital assistant, and a pager.

31. The method of claim 19, wherein the automated modification step may determine that no mode of alert indication may be utilized by the signal receiving device while within the environment.

32. The method of claim 19, further comprising the step of blocking signals to and from the signal receiving device while within the environment.

* * * * *